April 27, 1965  W. C. KLANK, JR  3,180,345
VENTED LIQUID STORAGE TANK
Filed Aug. 22, 1962  2 Sheets-Sheet 1

INVENTOR.
WALTER C. KLANK, JR.
BY
HIS ATTORNEY

April 27, 1965   W. C. KLANK, JR   3,180,345
VENTED LIQUID STORAGE TANK
Filed Aug. 22, 1962   2 Sheets-Sheet 2

INVENTOR
WALTER C. KLANK, JR.
BY
J. E. Beringer
HIS ATTORNEY

United States Patent Office 3,180,345
Patented Apr. 27, 1965

3,180,345
VENTED LIQUID STORAGE TANK
Walter C. Klank, Jr., Dayton, Ohio, assignor to United Aircraft Products, Inc., Dayton, Ohio, a corporation of Ohio
Filed Aug. 22, 1962, Ser. No. 218,727
7 Claims. (Cl. 137—43)

This invention relates to tanks storing a liquid and useful in vehicles such as aircraft wherein the tank assumes varying attitudes with respect to the earth's surface in correspondence with the movement of the aircraft. While not so limited, the invention has special application to oil supply systems in aircraft in which a single tank serves as a storage chamber for a plurality of oil using systems, there being a common return to the tank and separate withdrawal therefrom in accordance with a priority system of supply.

An object of the invention is to construct a tank as described with a vent system combining the features of the vent or air chamber with the rotary pendulum.

Another object of the invention is to control the vent system in a manner to preclude a loss of liquid therethrough when the tank is subjected to negative and like gravity forces.

A further object of the invention is to provide a generally new arrangement of liquid withdrawal means according to a priority concept using a combination of fixed and rotary pendulum pick-up means.

Figure 1:
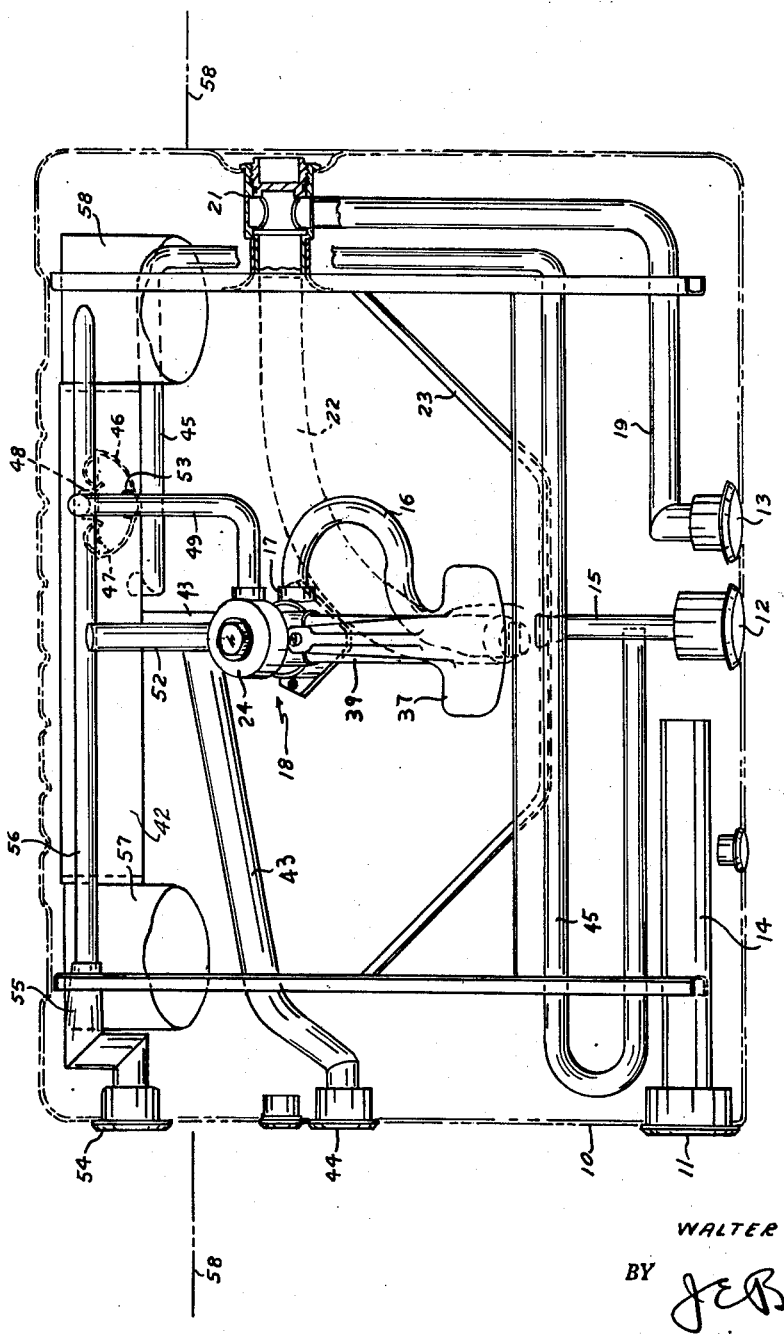
Figure 2:
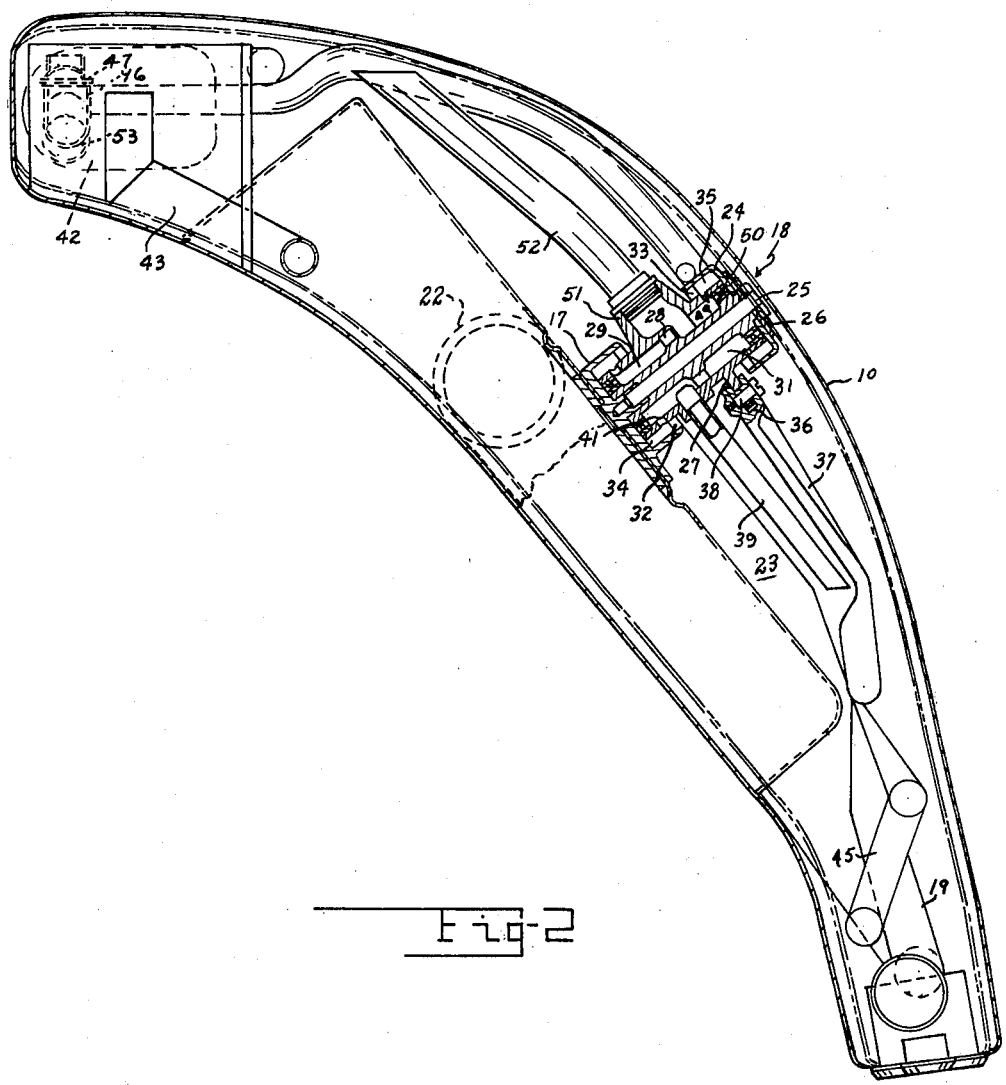

Other objects and structural details of the invention will appear from the following description when read in connection with the accompanying drawings, wherein:

FIG. 1 is a partly diagrammatic view in front elevation of the interior structure of a tank in accordance with the illustrated embodiment of the invention, the tank proper being shown in outline form; and FIG. 2 is a view in side elevation, and also partly diagrammatic, of a tank as shown in FIG. 1.

Referring to the drawings, a tank in accordance with the illustrated embodiment of the invention is one adapted for use in aircraft to contain an oil for supplying the needs of an engine lubrication system, a hydraulic system and a constant speed drive system. Separate outlets are provided from the tank to the several systems, return flow to the tank being by way of a common inlet. Problems of assigning a priority of supply to the several systems, as well as that of ridding the tank of excess air brought to it with the returning oil, provide the occasion for structural features of the tank to be described.

The tank comprises an outer shell 10 which may have a curved configuration as shown in FIG. 2 for mounting in a space saving relation to a cylindrical surface. The tank interior has a normal lower portion and a normal upper portion, having regard to a normal flight attitude. At what may be considered to be the bottom of the tank shell, since in a normal flight attitude it is the lowermost part of the tank, are oil outlets 11, 12 and 13. Outlet 11 communicates directly with the tank interior in the lowermost portion thereof, through a laterally extending short length tube 14. Outlet 12 communicates with one end of a vertically extending tube 15 having a curved portion 16 and terminating at its other end in a circular housing 17 forming part of a pendulum means 18 disposed transversely in the shell 10 intermediate upper and lower portions thereof. Through the pendulum means 18, the tube 16 and outlet opening 12 define an outlet connection from the tank supplying another system which in the illustrated instance is the constant speed drive system. The outlet 13 communicates with a tube 19 angling upward in the tank shell to terminate in a housing 21 suitably fixed in the shell 10. Also extending into the housing 21 and communicating therethrough with the tube 19 is one end of a flexible tube 22. The latter projects into the tank shell 10 through one end thereof and is as noted flexible in a manner to respond to gravity forces in a manner to seek out the contained body of liquid in the tank irrespective of tank attitude. The tube 22 is predetermined as to length, and is confined by an interior partition 23 to be capable of limited following motion of a descending oil level. Beyond such limit the tube 22 is ineffective to draw upon the contained oil. The tube 22, communicating fixed tube 19 and outlet 13, supply a hydraulic system. The construction and arrangement of parts precludes leakage or misoperation in the hydraulic system from draining the oil from the tank shell 10 below a predetermined level.

The pendulum means 18 comprises, in addition to the housing section 17, a like opposing section 24, the respective sections being secured to the interior partition 23 and to a recessed front wall of the tank shell 10. The arrangement places the pendulum means 18 and the flexible tube 22 in a separated relation on opposite sides of the partition 23. A bolt 25 interconnects the two housing sections 17 and 24 and further provides a mount for a cylindrical bearing sleeve 26. Rotatably mounted on bearings at the ends of the sleeve 26 is a tubular body 27. Intermediate oil seal means 28 divides the interior of body 27 into separated chambers 29 and 31. Other oil seal means 32 and 33 define chambers 34 and 35 respectively in the housing sections 17 and 24.

A projecting tongue 36 on body 27 has a weighted arm 37 dependent therefrom through pivotal attachment means 38. Also dependent from the tubular body 27 is a tube 39 open at its outer end to communicate with the tank interior and open at its inner end to communicate with chamber 29 in the body 27. The latter chamber in turn communicates through radial openings 41 with the interior chamber 34 of housing section 17. The aforementioned tube 16 likewise communicates with interior chamber 34. Tank outlet 12 is thus supplied from dependent tube 39 through the pendulum means 18 as represented by chamber 29 of the body 27 and chamber 34 of the housing section 17. Pendulum 27 tends to maintain the tube 39 pointed continuously downward so as to maintain a contact with the contained body of oil in both normal and inverted flight attitudes. The length of tube 39 is predetermined in relation to the depth of the tank to establish a limit upon which the level of oil in the tank may be depleted through the tube 39.

The vent system includes a closed inner tank in the normal upper portion of the tank shell 10 defining an air chamber 42. A vent tube 43 has one end entering chamber 42 at a point near the volumetric center of the chamber. Tube 43 extends at its other end to one end of the tank shell opening to the exterior thereof through a fitting 44. Another tube 45 opens through the bottom of the vent chamber 42 and extends circuitously downward through the tank shell to terminate in the normal lower portion of the tank intermediate the ends thereof. Still further there is stationed stationarily within the air chamber 42 a cage 46. A lid 47 on the cage 46 has perforate dome portions by which the cage communicates with the interior of the air chamber and thence with vent tube 43. Further, an upwardly directed portion 48 of the lid 47 is stationarily connected by means of a tube 49 to the end housing section 24 of the pendulum means 18. Communication accordingly is established between cage 46 and the interior chamber 35 of housing section 24. Chamber 35 in turn communicates through a series of ports 50 with chamber 31 in tubular body 27. The latter communicates through a boss 51 with an upstanding tube 52 open at its upper end to provide a vent passage for air and gas in the normal upper portion of the tank shell interior. The cage 46 in vent chamber 42 contains a freely movable weighted ball 53. The ball 53 normally occupies a seat in the bottom of cage 46 opposite projection 48 in lid 47. A free communication of the vent chamber 42 with the upstanding vent tube 52 is accordingly normally established. Under conditions of negative gravity and inverted flight attitude, however, the ball 53 may move to a seat in projection 48 closing communication of tube 49 with the cage interior. Communication of the vent chamber 42 with vent tube 52 is thus at this time closed or prevented.

Oil returns to the tank by way of a fitting 54 in the normal upper portion of the tank. By virtue of communicating tubes 55 and 56 the returning oil is directed to open ended deaerators 57 and 58. A separation of air and liquid there takes place, with the air tending to collect in the normal upper portion of the tank above the liquid level. The latter is represented by the line 58. Tube 52 rises above the normal oil level and hence is enabled to carry off the released air which is conducted through the pendulum means 18 and by way of tube 49 to the vent chamber 42 where it is vented overboard by way of tube 43. The continuous communication afforded between the normal upper portion of the tank shell and the vent chamber 42 is discontinued, as noted, under conditions of inverted flight attitude and of negative gravity by reason of the seating of ball 53 in projection 48. The possibility of oil being admitted to the vent chamber accordingly is minimized. Such oil as may be admitted thereto is trapped in the chamber and subsequently returned to the tank through the tube 45. The latter acts under negative gravity and inverted flight conditions as a vent, the lower end thereof projecting at this time above the liquid level.

What is claimed is:

1. A liquid storage tank subject in use to changing gravity forces, including a tank shell to hold a quantity of liquid and having normal upper and lower portions, a normal liquid level in said tank shell and a space within the tank shell above the liquid level, venting apparatus including an air chamber connected to the tank and located in the normal upper portion thereof, pendulum means rotatable about an axis extending transversely across an intermediate portion of the tank shell, said pendulum means including a radially projected air intake tube, a transversely mounted hub defining the axis of rotation of said pendulum means and having an air passage therein, an air flow connection from said passage in said hub to said air chamber, a passage venting said air chamber to the exterior of the tank shell, and a drain passage connecting said air chamber to the normal lower portion of the tank shell interior, said drain passage connecting the space above the liquid level to said air chamber under the application of gravity forces in certain directions.

2. A liquid storage tank according to claim 1, characterized by means discontinuing communication of the space above the liquid level with said air chamber through said pendulum means during application of gravity forces in said certain directions.

3. A liquid storage tank subject in use to changing gravity forces, including a tank shell to hold a quantity of liquid and having normal upper and lower portions, a normal liquid level in the tank shell and a space therein above the liquid level, venting apparatus including an air chamber connected to the tank and located in the normal upper portion thereof, a hub extending transversely across an intermediate portion of said tank shell, said hub having an air flow passage therein, a fixed connection communicating said air flow passage to said air chamber, a rotary pendulum on said hub having a radially projected tube continuously communicating the space above the liquid level in the tank shell to said air flow passage, means for venting said air chamber to the exterior of the tank shell, means to exclude said air chamber from communication with said air flow passage in response to the application of gravity forces in certain directions, and other means communicating the space above the liquid level with said air chamber during application of gravity forces in said certain directions.

4. A liquid storage tank according to claim 3, characterized in that said other means serves during application of gravity forces in directions other than said certain directions as a drain for liquid inadvertently admitted to and trapped in said air chamber.

5. A liquid storage tank according to claim 3, characterized in that said other means comprises a fixed connection extending from said air chamber to the normal lower portion of the tank shell interor, said connection being continuously open and serving as a liquid drain during application of gravity forces other than those applied in said certain directions.

6. A liquid storage tank subject in use to changing attitudes and holding a quantity of liquid, including a tank shell having front and back walls and an intermediate partition, a hub extending transevrsely across an intermediate portion of the tank shell between said partition and one of said walls, pendulum means rotatable on said hub on one side of said partition and including a dependent liquid intake conduit, a flow path through said hub for liquid picked up by said intake conduit, a flexible liquid intake conduit on the other side of said partition in said tank shell having its outlet end approximately in the lateral plane of said hub, a flow path from said tank shell communicating with the outlet end of said flexible conduit, said intake conduits supplying separate systems in varying tank attitudes and subject to a predetermined depletion of the liquid supply in the tank.

7. A liquid storage tank according to claim 6, characterized in that the portions of the tank shell interior on opposite sides of said partition and beneath it are in free communication whereby to present a common liquid level to said intake conduits.

References Cited by the Examiner
UNITED STATES PATENTS

| | | | |
|---|---|---|---|
| 2,662,538 | 12/53 | Cervino | 137—45 |
| 2,793,708 | 5/57 | Carroll | 137—45 XR |
| 2,800,975 | 7/57 | Carroll | 137—45 XR |
| 2,835,263 | 5/58 | Klank | 137—45 |
| 2,942,611 | 6/60 | Klank | 137—45 XR |
| 3,011,504 | 12/61 | Klank | 137—45 |

ISADOR WEIL, *Primary Examiner.*

CLARENCE R. GORDON, *Examiner.*